Oct. 7, 1952 L. MICHA 2,613,281

CORDLESS TELEPHONE SWITCHBOARD WITH INTERLOCKS

Filed Dec. 23, 1949 2 SHEETS--SHEET 1

INVENTOR.
LOUIS MICHA
BY
agt

CORDLESS TELEPHONE SWITCHBOARD WITH INTERLOCKS

Filed Dec. 23, 1949 2 SHEETS—SHEET 2

INVENTOR.
LOUIS MICHA
BY
Michael S. Striker
his Agent

Patented Oct. 7, 1952

2,613,281

UNITED STATES PATENT OFFICE 2,613,281

CORDLESS TELEPHONE SWITCHBOARD WITH INTERLOCKS

Louis Micha, Rue Augustin Vento, Principality de Monaco

Application December 23, 1949, Serial No. 134,823
In France December 30, 1948

3 Claims. (Cl. 179—91)

The present invention relates to switchboards for telephone exchanges, and more particularly to P. B. X switchboards for the connection of trunk lines and local lines with one another and of local lines between each other.

The present invention is an improvement of the invention described and claimed in my co-pending application Serial No. 34,938, filed June 24, 1948, now Patent 2,559,561, issued July 3, 1951.

It is an object of the present invention to provide control means which are prefabricated and exchangeable.

It is another object of the present invention to reduce the number of contacts serving for the connection of the local lines with the interconnecting circuits.

It is a further object of the present invention to prevent an intermingling of the interconnecting circuits.

It is a still further object of the present invention to preserve the secrecy of the conversations and to render inoperative any false maneuvering of the switchboard.

It is a still further object of the present invention to signal to the operator any false maneuvers which would result in the connection of more than one local line to one and the same trunk line, of more than two local lines to one another, or of one line to more than one interconnecting circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3:
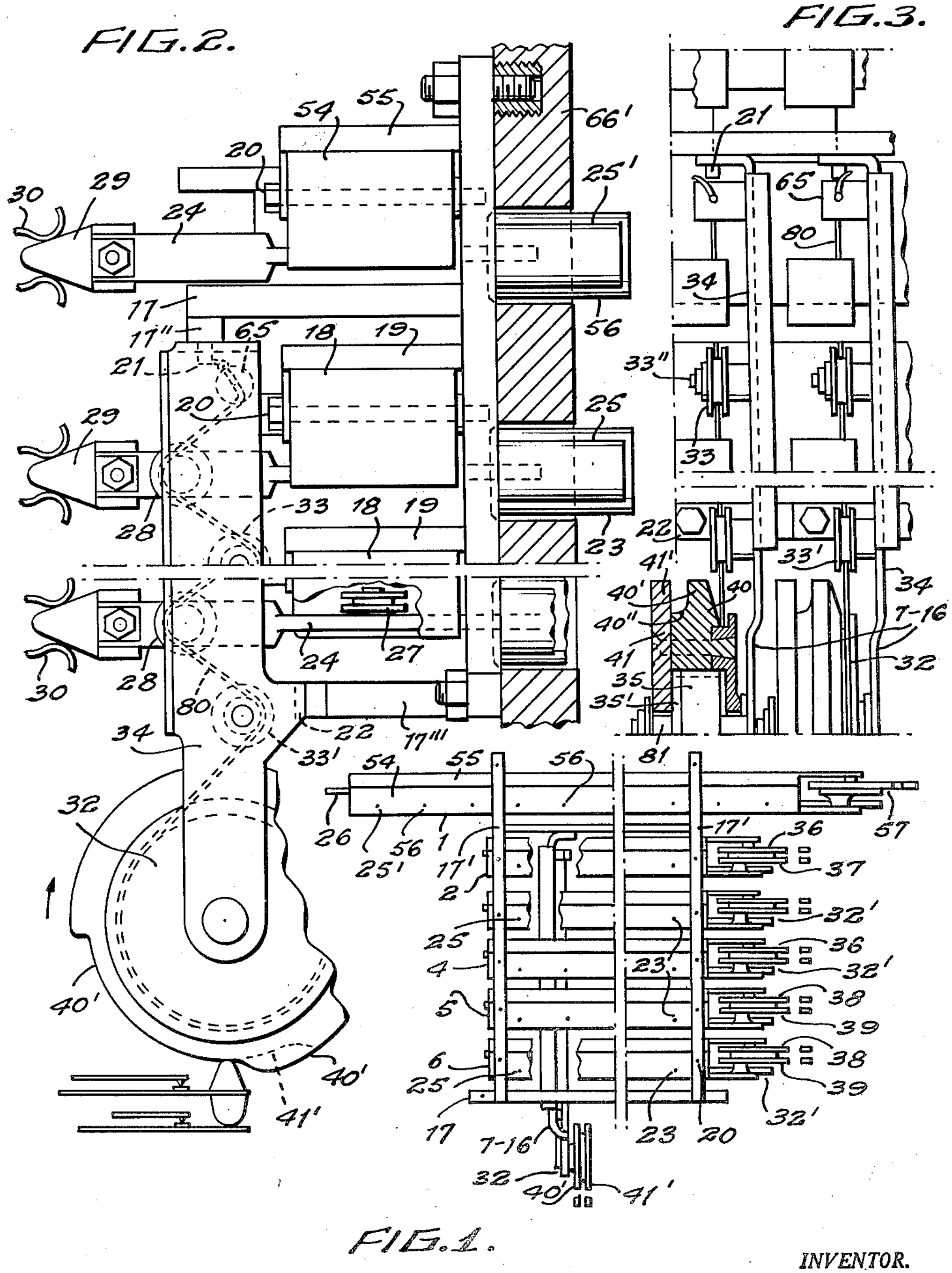
Fig. 1 is a diagram showing in a front elevation the principle of a switchboard according to the invention.
Fig. 2 is a side elevation on a larger scale of the switchboard shown in Fig. 1.
Fig. 3 is a rear view of part of the switchboard shown in Fig. 1.

Referring now to the drawings, and first to Figs. 1 and 2, ten local lines are shown in addition to three trunk lines and two circuits for private conversation between any of the local lines.

Fig. 1 shows, opposite to the operator, six mechanical elements 1 to 6 which belong, respectively, to the operator's circuit and to the five interconnecting circuits, namely three for the connection with the trunk lines and two for the connection between any local lines.

Also ten mechanical elements 7 to 16 are shown which belong to the ten local lines.

The elements 2 to 6 and 7 to 16 are interconnected in pairs as described more fully hereinafter. The element 1 belonging to the operator's circuit by which he answers any questions from the trunk or local lines is without any mechanical interconnection with the other mechanical elements.

Each of the mechanical elements which serves for the control of an interconnecting circuit of a local line, is a circuit-limiting device as more fully described in my co-pending application Serial No. 34,938, filed June 24, 1948, now Patent No. 2,559,561, issued July 3, 1951, and includes a cord such as 80 running in a zigzag fashion between stationary pulleys such as 33 and mobile pulleys such as 28 arranged in a plane. The cord 80 is wound on a drum such as 32 having cams such as 40' and 41', the rotation of which is controlled by the translatory motion of the mobile pulleys which are rigidly connected to control buttons, respectively.

The mounting of the limiting devices on the chassis of the switchboard is accomplished in the following manner: Each limiting device belonging to an interconnecting circuit is enclosed in a box 18, preferably made of metal and provided with a lid 19. The whole is mounted on the uprights 17' of the chassis 17 by means of two screws 20. The small sides of each limiting device belonging to a local line are connected, respectively, to a pin 21 rigidly connected to the upper cross member 17'' and by a single fixing screw 22 to the lower cross member 17''' of the chassis 17.

The horizontally arranged mechanical elements, which control the interconnecting circuits, are each associated, respectively, with a so-called communication button 23 which is locked in the pressed-in position in a manner more fully described hereinafter. The communication buttons are provided in each row in a number corresponding to that of the local lines i. e. in the shown embodiment in tens. A releasing button 25 is provided for each row, i. e. for each interconnecting circuit.

Each communication button 23 is rigidly connected with a rod-shaped body 24 which carries two pulleys 27 and 28 arranged crosswise to each other, i. e. with their planes at right angles. The buttons 23 control, by means of the insulating tips 29 of the bodies 24, the contacts 30 which establish the connection of the local lines with the interconnecting circuits. The cord 80 of the limiting devices belonging to any local line is fixed at 65 to the bracket 34 and pass over stationary pulleys 33 and 33', this last pulley being arranged near the drum 32.

The set of buttons 56 belonging to the operator's circuit are associated with a limiting device including a drum with a cam 57 which prevents the operator from connecting his circuit to several lines at the same time. This limiting device has no vertical pulleys such as 28 since it is independent of the other limiting devices.

Referring now to Fig. 3 showing a rear view of the mechanical elements of only two local lines, it will be seen that the stationary pulleys 33 and 33' and the drums such as 32 are arranged on axles such as 33'' and 81 which are carried by brackets 34. One of the drums is shown in section in Fig. 3 to show more clearly the design of the drums. Each drum comprises a molded body 40 consisting of a suitable plastic with a metallic groove 40'' and a cam 40' which forms part of the molded body. A cover 41 consisting also of a molded plastic forms a cam 41' on its periphery and closes a space 35' for accommodating a spiral spring 35 which urges the drum into its end position. The axle 81 traverses the cover 41 with little friction.

Figure 4:
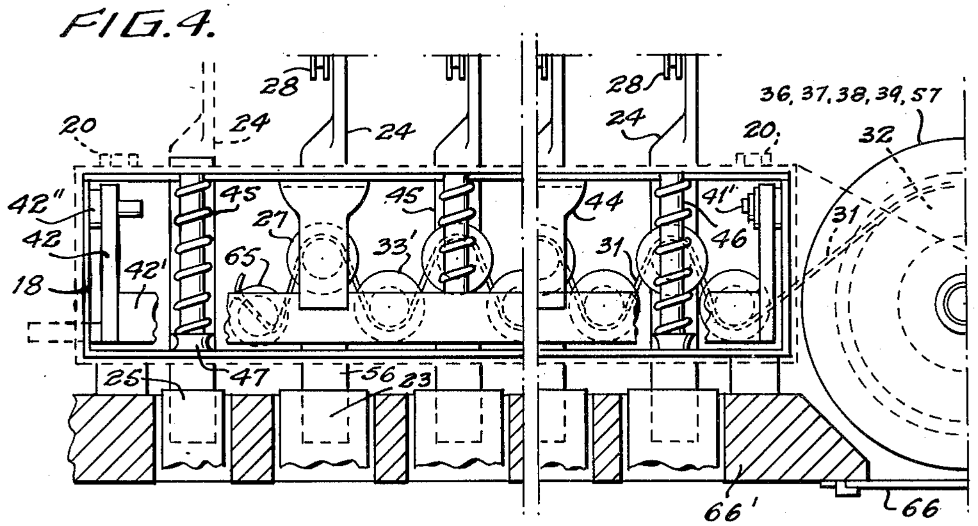
Fig. 4 is a plan view of part of the switchboard shown in Figs. 1–3.

Fig. 4 shows in plan view one of the limiting devices belonging to the intercommunication circuits. The limiting device includes movable pulleys 27, stationary pulleys 33' and 33, and a cord 31 runing in zigzag fashion between its point of attachment 65' and the drum 32'. The drums carry several cams such as 36 and 37 for the interconnection circuits between a trunk line and a local line, such as 38 and 39 for the interconnection circuits between two local lines, or only one cam 57 for the drum associated with the operator's circuit. These cams control contacts more fully to be described hereinafter which break or complete electric circuits for the establishment of interconnections or for rendering inoperative the circuits in case of a false manoeuvering in which case a drum exceeds the permitted number of unit angular displacements.

The panel 66' of the switchboard is provided with a plurality of small rectangular apertures closed by small window panes 66 which allow to ascertain whether a drum is in working position which is an indication that a button is depressed in on the corresponding intercommunication circuit, thus saving a visual electric signal for this purpose. Equally this arrangement allows to ascertain whether a mechanical obstruction prevents the drum from rotating. Every visible part of the drums except that corresponding to the rest position is brightly colored.

The axles of the releasing buttons 25 may be provided with a body 24 such as the communication buttons 23 are provided with, if the release is accompanied by the instantaneous establishment of a circuit. This is the case sometimes for the release button 25' (Figs. 1 and 2) of the operator's circuit which has to actuate a service relay at the return to the initial position.

Figure 5:
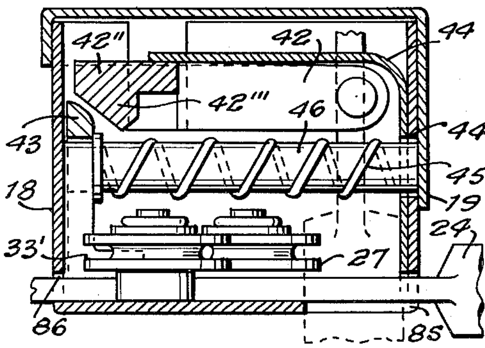
Fig. 5 is an enlarged section through one of the elements of Fig. 4.

Fig. 5 shows on a larger scale a mechanical element of Fig. 4. Angular pieces 43 are rigidly connected to the bodies 24 of the buttons 23 and 56 and tension the helical springs 45 arranged on guiding shafts 46 when the button is pressed in. The angular pieces 43 are locked in the spring-compressing position by a projection 42''' of a bar 42' extending between two brackets 42 pivoted at 42'' to the box 18. The lid 19 of the box 18 prevents the associated drum 32' and the shafts 46 from sliding with respect to the box 18. The contour shown in dotted lines in Fig. 5 illustrates the position of the bodies 24 before the connection of the pulleys 27 and 28 and the fixing of the insulating tips 29. The apertures 85 and 86 through which the bodies 24 extend are made in the box 18 before bending same and the portions of the apertures which are situated in the finished box on its side walls allow only an axial translation of the bodies 24.

Two leaf springs 44 bent at right angles press the bar 42' against the angular pieces 43. Each of the leaf springs 44 is provided with a hole 44' for the passage of one of the guiding shafts 46 and is thus pressed against the wall of the box 18 by the helical spring 45 which is arranged on the shaft 46.

Figure 6:
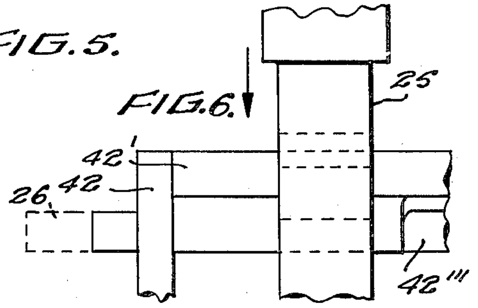
Fig. 6 shows on an enlarged scale a detail of the switchboard shown in Figs. 4 and 5.

Fig. 6 shows from below the end of a bar 42' and part of the bracket 42 together with a releasing button 25. The latter returns immediately to its rest position without being locked owing to the fact that the bar 42' has no projection 42''' at the end. The mechanical element of the operator's circuit is provided with a lengthened end 26 (see also Fig. 1) that is lifted up when the operator suspends his receiver and thereby automatically releases his locking bar.

The operation of this device is as follows:

As will be seen from Fig. 1 the switchboard has a plurality of buttons 23 which are arranged in rows and columns. Buttons in the same column belong to the same local line. Buttons in the same row belong to the same intercommunication circuit, some of which make a connection with a trunk line (in the shown embodiment three) and some of which connect two local lines (in the shown embodiment two).

If a button 23 is pressed in, one of the drums 32 and one of the drums 32' are rotated through a unit angle. This is achieved by the cords 80 and 31 the zigzag part of which is lengthened by a certain amount corresponding to the translatory movement of the mobile pulleys 27 and 28 connected to the body 24 of the button 23. If the button 23 belongs to one of the trunk lines the rotation of the respective drums 32 and 32' through one unit angle brings about the connection between the local line and the trunk line as will be explained more fully hereinafter.

If two buttons 23 belonging to different vertical columns and to the same horizontal row are pressed in, the respective drums 32 are rotated through one unit angle whereas the respective drum 32' is rotated through two unit angles. This operation is permissible if the intercommunication circuit is a local one, but not if it is a trunk intercommunication circuit. It will be explained hereinafter more fully how these cases are distinguished from one another.

All other operations are rendered ineffective, i. e. those which lead to a rotation through more than one unit angle of the trunk line drums or the local line drums and those which lead to a rotation of more than two unit angles of the local interconnection drums.

Figure 7:
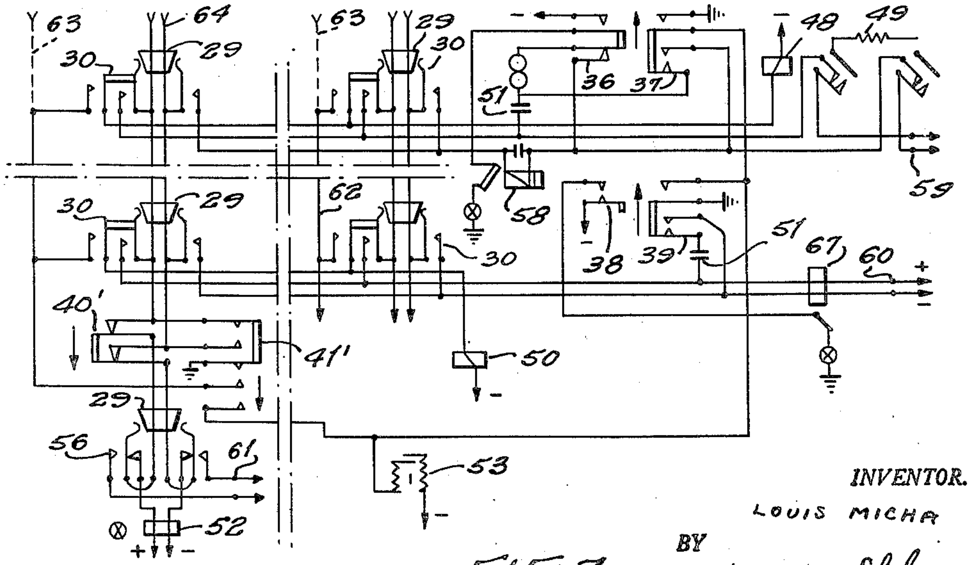
Fig. 7 is a diagram showing the electrical circuits used in connection with a switchboard according to Figs. 1–4.

Referring now to Fig. 7 the wiring diagram of the electrical circuits controlled by the cams 40' and 41' of the local line drums, by the cams 36 and 37 of the trunk line drums, and by the cams 38 and 39 of the local interconnection drums is shown. The operator's circuit is not shown in Fig. 7. The drum (Fig. 1) of the operator's circuit has only one cam 57 which switches off his apparatus when he presses in more than one of the buttons 56 at the same time.

Fig. 7 shows only the first and the last of the columns and in each column only two buttons which are represented by the insulating tips 29 connected to them. The upper button in each column corresponds to a trunk line whereas the lower button belongs to a local intercommunication circuit. The cams are represented in this figure by the group of contacts which they control and which bear the same reference numerals as the cams themselves have in Figs. 1 to 4.

The cams 41' have the task to secure the secrecy of any conversation which would be impaired if it were possible to connect the same local line to more than one interconnecting circuit. The cams 41' switch in directly the service relays 48 of the trunk lines and 50 of the local interconnecting circuits. The cams 37, 39, and 41' cause also a buzzer 53 or the like to operate whenever a false manoeuvre is attempted.

The cams 40' of the local lines play the part of interrupting relay by interrupting the connection of these lines with their indicators 52 and to the terminals 61 of the operator's circuit, thus preserving the secrecy of the conversations on the local lines with respect to the operator.

The cams of the intercommunication circuits serve to preserve secrecy with respect to the local lines as more fully described hereinafter.

If a false manoeuvre is carried out with respect to the intercommunication circuits by pressing in more than one button with respect to one trunk line or more than two buttons with respect to a local intercommunication circuit, the cams 37 and 39 prevent talking by switching in condensers 51 in the intercommunication circutis.

If a false manoeuvre is attempted with respect to two intercommunication circuits by pressing in two buttons in the same column, the cam 41' of the local line switches on the relays 48 and 50 inserted in service wires of the intercommunication circuits the intermingling of which is attempted. The relays 48 switch off the incoming calls on the trunk lines and establish the protection of these lines over resistances 49. The two buttons pressed in, in the same column cause equally the free loop of the corresponding local line to be switched off by the cam 41' which has made a rotation through two unit angles. The intercommunication circuits are also separated as a consequence of this false manoeuvre.

Thus it will be seen that each drum 32 has two cams 40' and 41', the first cam 40' coming to action when only one of the associated buttons 23 is pressed in, whereas the other cam 41' comes into action when the drum is rotated through a second unit angle in consequence of the pressing in of a second button 23 in the same column.

The described system of mechanical control allows to connect the intercommunication circuits to the local lines without the so-called interrupting contacts and the known relays which are fed by currents the intensity of which varies according to the number of interconnected circuits. All service relays can be dispensed with except the insulating and protecting relays 48 of the trunk lines, the supervisory relays 58 of the trunk lines, and the feeding relays 67 of the local intercommunication circuits.

If the switchboard is to allow a calling back of the operator, the connection 62 of each local line is prolonged by a wire 63 going to the local station so that the local station can energize the relays 48 or 50 according to the engaged intercommunication circuit.

From a point of view of standardization of the switchboards according to a certain capacity the limiting devices with pulling cord allow to provide a uniform scheme and a limited number of types of the mechanical elements described hereabove. It is sufficient to provide two or three types of boxes 18 with their total capacity of buttons 23 or only part of these buttons. Similarly, two or three types of brackets 34 are sufficient, the number of interconnection circuits varying for instance between three and seven.

It will be understood that each of the elements described above, or two or more together, may also find a useful application in other types of switchboards for telephone exchanges differing from the types described above.

While I have illustrated and described the invention as embodied in P. B. X switchboards for the connection of trunk lines and local lines with one another and of local lines between each other, I do not intend to be limited to the details shown, since various modifications and structural changes may be made without departing in any way from the spirit of my invention.

Without further analysis, the foregoing will so fully reveal the gist of my invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patents is:

1. A switchboard for connecting local lines to trunk lines and local lines in pairs, comprising in combination, a chassis; hand operated members arranged in said chassis; means whereby said members initiate, respectively, the connections between any local lines and the lines to be connected to same; first movable pulleys arranged parallel to one another; means whereby said first movable pulleys are, actuated, respectively, by said members; first stationary pulleys; means whereby said stationary pulleys are associated, respectively, with said first movable pulleys, said first stationary pulleys being arranged parallel to said first movable pulleys; a first pulling cord; means whereby said first pulling cord cooperates with said first movable pulleys and said first stationary pulleys; a first drum driven by said first pulling cord and adapted to be rotated by said first pulling cord through an integral multiple of a unit angle; a bracket connected to said chassis and carrying said first stationary pulleys and said first drum; means actuated by said first drum when said first drum is rotated through more than one unit angle and adapted to prevent a wrong connection of the lines; second movable pulleys; means whereby said second movable pulleys are actuated, respectively, by said members;

said second movable pulleys being arranged parallel to one another and at right angles to said first movable pulleys; second stationary pulleys arranged parallel to said second movable pulleys; means whereby said second stationary pulleys are associated, respectively, with said second movable pulleys; a second pulling cord; means whereby said second pulling cord cooperates with said second movable pulleys and said second stationary pulleys; a second drum driven by said second pulling cord and adapted to be rotated by said second pulling cord through integral multiples of a unit angle; a box rigidly connected to said chassis and carrying said second stationary pulleys and said second drum; and means actuated by said second drum when said second drum is rotated through more than two unit angles and adapted to prevent a wrong connection of the lines.

2. A switchboard for connecting local lines to trunk lines and local lines in pairs, comprising in combination, a chassis; hand operated members arranged in said chassis; means whereby said members initiate, respectively, the connections between any local lines and the lines to be connected to same; first movable pulleys arranged parallel to one another; means whereby said first movable pulleys are actuated, respectively, by said members; first stationary pulleys arranged parallel to said first movable pulleys; means whereby said first stationary pulleys are associated with said first movable pulleys; a pivot pulling cord; means whereby said first pulling cord cooperates with said first movable pulleys and said first stationary pulleys; a first drum driven by said first pulling cord and adapted to be rotated by said first pulling cord through an integral multiple of a unit angle; a bracket connected to said chassis and carrying said first stationary pulleys and said first drum; means actuated by said first drum when said first drum is rotated through more than one unit angle and adapted to prevent a wrong connection of the lines; second movable pulleys; means whereby said second movable pulleys are actuated, respectively, by said members, said second movable pulleys being arranged parallel to one another and at right angles to said first movable pulleys; second stationary pulleys arranged parallel with said second movable pulleys; means whereby said second stationary pulleys are associated, respectively, with said second movable pulleys; a second pulling cord; means whereby said second pulling cord cooperates with said second movable pulleys and said second stationary pulleys; a second drum driven by said second pulling cord and adapted to be rotated by said second pulling cord through integral multiples of a unit angle; a box rigidly connected to said chassis and carrying said second stationary pulleys and said second drum; a bar arranged in said box and pivotally connected to the walls of said box; detents arranged on said members and cooperating with said bar in one end position thereof; a leaf spring rigidly secured to said box and cooperating with said bar to hold said bar in detent locking position; and means actuated by said second drum when said second drum is rotated through more than two unit angles and adapted to prevent a wrong connection of the lines.

3. A switchboard for connecting local lines to trunk lines and local lines in pairs, comprising in combination, a chassis; hand operated members arranged in said chassis; means whereby said members initiate, respectively, the connections between any local lines and the lines to be connected to same; first movable pulleys arranged parallel to one another; means whereby said first movable pulleys are actuated, respectively, by said members; first stationary pulleys; means whereby said first stationary pulleys are associated, respectively, with said first movable pulleys, said first stationary pulleys being arranged parallel to said first movable pulleys; a first pulling cord; means whereby said first pulling cord cooperates with said first movable pulleys and said first stationary pulleys; a first drum driven by said first pulling cord and adapted to be rotated by said first pulling cord through an integral multiple of a unit angle; a bracket connected to said chassis and carrying said first stationary pulleys and said first drum; means actuated by said first drum when said first drum is rotated through more than one unit angle and adapted to prevent a wrong connection of the lines; second movable pulleys; means whereby said second movable pulleys are actuated, respectively, by said members, said second movable pulleys being arranged parallel to one another and at right angles to said first movable pulleys; second stationary pulleys arranged parallel to said second movable pulleys; means whereby said second stationary pulleys are associated, respectively, with said second movable pulleys; a second pulling cord cooperating with said second movable pulleys and said second stationary pulleys; a second drum driven by said second pulling cord and adapted to be rotated by said second pulling cord through integral multiples of a unit angle; a box rigidly connected to said chassis and carrying said second stationary pulleys and said second drum; a bar arranged in said box and pivotally connected to the walls of said box; detents arranged on said members and cooperating with said bar in one end position thereof; helical springs arranged on said members and urging said members into non-operative position, said helical springs being interposed between said detents, respectively, and the wall of said box; a leaf spring rigidly secured to said box and cooperating with said bar to hold said bar in detent locking position; and means actuated by said second drum when said second drum is rotated through more than two unit angles and adapted to prevent a wrong connection of the lines.

LOUIS MICHA.

REFERENCES CITED

The following references are of record in the file of this patent:

UNITED STATES PATENTS

| Number | Name | Date |
|---|---|---|
| 833,778 | Craft | Oct. 23, 1906 |
| 1,380,156 | Moore | May 31, 1921 |
| 1,828,455 | Borgmann | Oct. 20, 1931 |
| 1,999,497 | Arndt | Apr. 30, 1935 |